United States Patent [19]

Cenci et al.

[11] 4,101,606

[45] Jul. 18, 1978

[54] METHOD FOR CURING POLYMERS CONTAINING ONE OR MORE CARBOXY OR ANHYDRIDE FUNCTIONS BY MEANS OF POLYMERS HAVING HYDROXYAMIDE GROUPS, AND COMPOSITIONS

[75] Inventors: Harry J. Cenci, Warminster; Graham Swift, Bluebell, both of Pa.

[73] Assignee: Rohm and Haas Company, Philadelphia, Pa.

[21] Appl. No.: 712,553

[22] Filed: Aug. 9, 1976

Related U.S. Application Data

[63] Continuation-in-part of Ser. No. 454,645, Mar. 25, 1974, abandoned.

[51] Int. Cl.² .................. C08G 69/48; C08G 81/00
[52] U.S. Cl. ...................... 260/857 UN; 260/851;
260/874; 526/15; 526/16; 526/56
[58] Field of Search ....... 260/857 UN, 857 L, 857 G, 260/851, 874; 526/56, 15, 16

[56] References Cited

U.S. PATENT DOCUMENTS

| | | | |
|---|---|---|---|
| 3,457,209 | 7/1969 | Mikofalvy | 260/29.6 TA |
| 3,585,172 | 6/1971 | Nishiyama et al. | 526/49 |
| 3,759,915 | 9/1973 | Kottke | 260/41 R |
| 3,833,529 | 9/1974 | Albers et al. | 260/29.2 N |
| 3,947,528 | 3/1976 | Wingler et al. | 260/901 |

FOREIGN PATENT DOCUMENTS

| | | |
|---|---|---|
| 1,068,037 | 5/1967 | United Kingdom. |
| 1,366,081 | 11/1974 | United Kingdom. |
| 1,309,513 | 3/1973 | United Kingdom. |

*Primary Examiner*—John Kight, III

[57] ABSTRACT

β-hydroxyalkylamide polymers are disclosed as curing agents for polymers containing one or more carboxy or anhydride functions. The compositions are effective in solution, aqueous emulsion and powder coating formulations.

25 Claims, No Drawings

METHOD FOR CURING POLYMERS CONTAINING ONE OR MORE CARBOXY OR ANHYDRIDE FUNCTIONS BY MEANS OF POLYMERS HAVING HYDROXYAMIDE GROUPS, AND COMPOSITIONS

This is a continuation-in-part of Ser. No. 454,645, filed Mar. 25, 1974, now abandoned, the disclosure of which is incorporated herein by reference, and is related to other continuation-in-part applications thereof. The claimed subject matter is divided from that of Ser. No. 454,645, now abandoned, wherein a restriction requirement had been made. The related applications are Ser. Nos. 686,004; 713,081; and 712,552, filed May 13, 1976, Aug. 9, 1976 and Aug. 9, 1976, respectively.

This invention relates to a novel method for curing or crosslinking polymers having carboxy or anhydride groups by treating the polymers with a polymer containing two or more β-hydroxyamide groups.

The β-hydroxyalkylamide polymers are efficient curing agents for carboxy containing and anhydride containing polymers, and can be employed with no catalyst being required, although an added acidic catalyst can be used. Furthermore, structural variations of the β-hydroxyalkylamides are relatively simple to attain, so that one can obtain optimum crosslinking efficiency for a given polymer backbone.

The process for curing and crosslinking the carboxy and anhydride containing polymers comprises reacting the polymer, in a preferred embodiment, with a copolymerized β-hydroxyalkylamide of the formula:

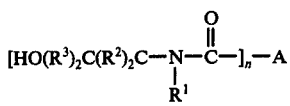

wherein A is an unsaturated alkyl (i.e., alkenylene) radical which contains from 1–60 carbon atoms, such as an unsaturated radical containing one or more ethylenic groups [>C=C<] such as ethenyl, 1-methylethenyl, 3-butenyl-1,3-diyl, 2-propentyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1–5 carbon atoms such as methyl, ethyl, n-propyl, n-butyl, sec-butyl, tert-butyl, pentyl and the like or hydroxy lower alkyl of from 1–5 carbon atoms such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1–5 carbon atoms or one of the $R^2$ and one of the $R^3$ radicals may be joined to form, together with the carbon atoms, cycloalkyl such as cyclopentyl, cyclohexyl and the like; and $n$ is an integer having a value of 1 or 2.

Various hydroxyalkylamide monomers may be used as long as the resulting polymer contains units of the formula:

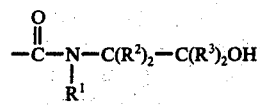

wherein $R^1$, $R^2$, and $R^3$ have the meanings given above. Preferably the formula is:

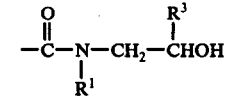

wherein $R^3$ is alkyl having 1 to 5 carbon atoms, preferably 1 carbon atom. Where $R^1$ is hydroxyalkyl, it is preferably the same as the hydroxyalkyl depicted. For instance, ethylenically unsaturated addition polymerizable monomers may be used which have the formula:

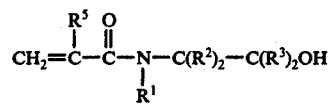

wherein $R^1$, $R^2$, and $R^3$ are as described above, and $R^5$ is —H or —CH$_3$. It is preferred that such monomers are copolymerized by addition polymerization in minor amounts of 1% to 50%, preferably 1% to 20%, of the total weight of ethylenically unsaturated monomers.

Suitable hydroxyalkylamide-containing polymers for curing the carboxy- or anhydride-containing polymers are those obtained by polymerizing monomers having the foregoing formula I, wherein $R^1$ is H, lower alkyl, or HO($R^3$)$_2$C($R^2$)$_2$C—, $n$ is 2, A has 2–8 carbon atoms, each $R^2$ is H, and one of the $R^3$ radicals in each case is H and the other is H or a $C_1$–$C_5$ alkyl; that is,

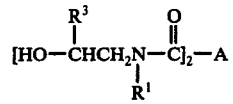

wherein A, $R^1$, $R^3$, and $n$ have the meanings just given. Examples of preferred compounds fall within the formula:

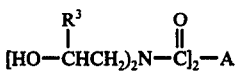

wherein $R^3$ is limited to H in both cases or —CH$_3$ in both cases. Specific examples of suitable monomers are bis[N,N-di(β-hydroxyethyl)] maleamide, bis[N,N-di(β-hydroxypropyl)] fumaramide, bis[N,N-di(β-hydroxyethyl)] citraconamide, bis[N,N-di(β-hydroxypropyl)] maleamide, and bis[N-methyl-N-(β-hydroxyethyl)] mesaconamide. Such bis-amides can have, as the unsaturated moiety, the residue of various unsaturated polycarboxylic acids.

As exemplary of such polycarboxylic unsaturated aliphatic acids, their anhydrides or chlorides suitable for use in the preparation of the hydroxyamides to be employed in this invention, there may be mentioned the following: maleic acid, maleic anhydride, fumaric acid, itaconic acid, itaconic anhydride, citraconic acid, glutaconic anhydride, dimethyl cirtaconic acid, dimethyl mesaconic acid, dimethyl itaconic acid, dimethyl itaconic acid, mesaconic acid, hexene-(2)-dicarboxylic acid, hexene-(3)-dicarboxylic acid, α-methyl glutaconic acid (cis and trans), β-methyl glutaconic acid (cis and trans), ethyl maleic acid, ethyl fumaric acid, τ-methyl itaconic acid, α-methyl itaconic acid, dimethyl maleic acid, dimethyl fumaric acid, trans-ethyl mesaconic acid, τ-propyl itaconic acid, β-propyl glutaconic acid, τ-n-hexyl itaconic acid, fumaryl chloride, and mixtures of such acids. Preferred are maleic, fumaric, itaconic, glutaconic, mesaconic, and citraconic acids.

The β-hydroxyalkylamides, (I, supra) are either known compounds or may be prepared by treating an ester of formula II (infra) with an amine of formula III (infra) at a temperature in the range of from about ambient up to about 200° C. Optionally, a catalyst may be employed, for example, potassium methoxide or butoxide and the like; quaternary ammonium alkoxides, such as tetramethylammonium methoxide and the like; alkali metal and quaternary ammonium hydroxides at an amount in the range of from 0.1 to 1.0 wt. % based on the weight of the ester. The reaction is preferably conducted at elevated temperatures. The following equation illustrates this process:

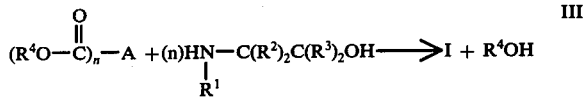

wherein A, $R^1$, $R^2$, $R^3$, and n, are as defined above and $R^4$ is lower alkyl of from 1–5 carbon atoms such as methyl, ethyl, propyl, n-butyl, tert-butyl, pentyl and the like.

The esters (II, supra) employed above are either known compounds or are prepared by esterifying the corresponding polycarboxylic unsaturated aliphatic acid by standard esterifying procedures well-known to those skilled in the art.

When "A" is the residue of an unsaturated dicarboxylic acid, the acid chlorides or anhydrides can be used, as follows:

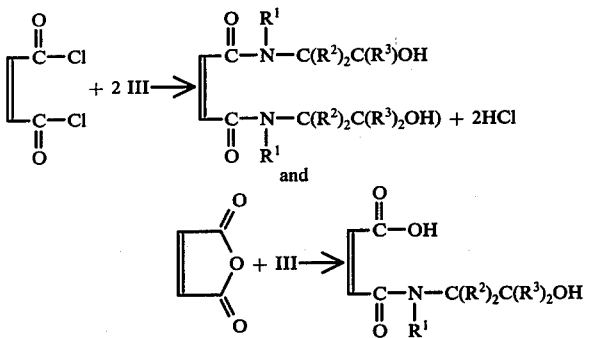

The latter is an example of a half amide.

Some representative examples of the amines falling within formula III which can be employed include 2-aminoethanol; 2-methylaminoethanol; 2-ethylaminoethanol; 2-n-propylaminoethanol; 2,2'-iminodiethanol; 2-aminopropanol; 2,2'-iminodiisopropanol; 2-aminocyclohexanol; 2-aminocyclopentanol; 2-aminomethyl-2-methylethanol; 2-n-butylaminoethanol; 2-methylamino-1,2-dimethylethanol; 2-amino-2-methyl-1-propanol; 2-amino-2-methyl-1,3-propanediol; 2-amino-2-ethyl-1,3-propanediol and 2-amino-2-hydroxymethyl-1,3-propanediol.

To cause curing of the carboxy or anhydride containing polymer, the β-hydroxyalkylamide polymer is mixed with said carboxy-containing polymer at a ratio of from about 0.1 to about 2 parts of hydroxy functions per one part of carboxy, or to 0.5 parts anhydride function, a 1:1 ratio of carboxy to hydroxy and a 0.5:1 ratio of anhydride to hydroxy function being preferred, and the curing reaction is subsequently carried out. Ratios outside of the above ranges may be employed but crosslinking efficiency is reduced. However, the cured mixture may, and commonly will, contain free hydroxyl or free carboxy groups, or both. For example, if an excess of the polymer having carboxy, carboxyl salt, or anhydride groups is used, the cured mixture of polymers will have such acid groups in the free, unreacted form. Solvents or dispersing media which may be employed to carry the mixture of polymers include aromatics, such as toluene, xylene and the like; aliphatics such as heptane, octane and the like; water, dimethylformamide, dimethylsulfoxide, also halogenated solvents, ethers, esters, alcohols, and ketones. Aqueous solutions are prepared from the salts of the carboxy-containing polymers for example amine salts such as dimethylaminoethanol, trimethylamine, triethylamine, diethanolamine, methylethanolamine, those amines of formula III or ammonium salts and the like, when the carboxy content is adequate. When films are cast or spray applied from aqueous systems, the pollution of the atmosphere which occurs when organic solvents are employed is eliminated. This advantage is important even when preparing powder coatings since no special precautions need be taken. To prepare powder coatings, aqueous formulations such as described for emulsion or solution polymers or solutions in organic solvents suitable for freeze drying, such as dioxane and benzene, or spray drying, e.g., toluene or methylene chloride, are employed, and the powder coating isolated by freeze drying or spray drying.

The polymer mixture is cured by heating at a temperature in the range of from 125° to about 400° C. and preferably in the range of from 125° to 175° C. for a period of time in the range of from about 0.5 to about 30 minutes. It is not necessary to employ a catalyst to effect curing.

This invention embraces all carboxy or anhydride containing polymers. Examples of preferred monomers which can be incorporated into the polymer backbone and crosslinked with the β-hydroxyalkylamide polymers include unsaturated monocarboxylic acids such as acrylic acid, methacrylic acid, and the like, unsaturated polycarboxylic aliphatic acids and derivatives noted above, such as maleic acid, 2-methylmaleic acid, itaconic acid, 2-methylitaconic acid, α,β-methyleneglutaric acid and the like, unsaturated anhydrides, such as maleic anhydride, itaconic anhydride, acrylic anhydride, methacrylic anhydride and the like, and half amides or half esters of dicarboxylic acids. Such carboxy or anhydride monomers are usually used in a minor proportion of the total monomers in an addition copolymer of ethylenically unsaturated monomers, that is, 1% to 50% by weight of the total monomers, preferably 1% to 20%.

Suitable monomers utilized in a major proportion to prepare the addition copolymer having the hydroxyamide groups or the copolymer having the carboxy function are represented by the formula:

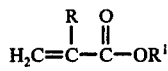

wherein R is H or alkyl having 1 to 4 carbon atoms and R$^1$ is the straight chain or branched chain radical of a primary or secondary alkanol, alkoxyalkanol or alkylthiaalkanol, the alkanol having from 1 to about 20 carbon atoms, examples being methyl, ethyl, methylpropyl, n-butyl, 2-ethylhexyl, heptyl, hexyl, octyl, propyl, 2-methylbutyl, 1-methylbutyl, butoxybutyl, 2-methylpentyl, methyoxymethyl, ethoxyethyl, cyclohexyl, n-hexyl, isobutyl ethylthiaethyl, methylthiaethyl, ethylthiapropyl, n-octyl, 6-methylnonyl, decyl, dodecyl, and the like. Also useful are an amide-containing monomer such as acrylamide, methacrylamide, or the methylol or methoxymethylol derivatives thereof, or a hydroxyl-containing monomer such as hydroxyethyl or hydroxypropyl acrylate or methacrylate. The hydroxyl-containing and amide-containing monomers may be used together, or singly. Other conventional addition polymerizable ethylenically unsaturated monomers include styrene, vinyl toluene, vinyl acetate, butadiene, and so forth.

The polymers can be used as coatings, including general purpose industrial coatings, machinery and equipment coatings, and especially metal coatings, such as for cans, appliances, automobiles and the like. In addition, the polymers can be used in forming films, fibers, paints, lacquers, varnishes, seamless flooring, caulks or impregnants; as adhesives for both natural and synthetic materials, such as paper, textiles, wood, plastics, metal and leather; as binders for non-woven fabrics; in the preparation of inks and in all areas where epoxy and melamine finishes are presently employed.

It should be apparent from this disclosure that when copolymers containing β-hydroxyalkylamides are prepared with monomers including carboxy containing monomers, a self-curing polymer will be obtained and when prepared without any carboxy or anhydride containing monomers, curing of the copolymer may be effected by treating said copolymers with acids or anhydrides such as those saturated acids mentioned above in the preparation of the esters of formula II and saturated anhydrides such as succinic, glutaric, phthalic, tetrahydronaphthalic, 1,2,4,5-benzenetetracarboxylic and the like. Mixtures of such acids with the carboxy-containing polymers are also useful in curing the polymers containing a β-hydroxyalkyl amide. Embodiments mentioned in this paragraph are the subject of separate divisional applications.

The following examples illustrate the invention:

EXAMPLE 1 - BA/MMA/St/MAN//60/12.5/20/7.5 wt. %

Butyl acrylate (BA) (288.0 g.), methyl methacrylate (MMA) (60.0 g.), styrene (St)(96.0 g.), maleic anhydride (MAN) (36.0 g.) and benzoyl peroxide (7.2 g.) are added to refluxing toluene (240.0 g.) over a period of 3 hours. After 0.5 hour hold at reflux, benzoyl peroxide (2.4 g.) in toluene (68.0 g.) is added over a period of one hour. A further hold of 0.5 hours at reflux is required for completion of the reaction. A toluene (372.0 g.) dilution yields a copolymer solution of 40.7% wt. solids and viscosity at 25° C. of 71 cps.

EXAMPLE 2 - BA/MMA/St/MAN//60/15/20/5 wt. %

Butyl acrylate (288.0 g.), methyl methacrylate (72.0 g.), styrene (96.0 g.) and maleic anhydride (24.0 g.) are polymerized as described in Example 1 to yield a copolymer of 40.8% solids in toluene, viscosity 55 cps. at 25° C.

EXAMPLE 3 - Ba/MMA/St/MMA//60/12.5/20.0/7.5

Butyl acrylate (288.0 g.) methyl methacrylate (60.0 g.), styrene (96.0 g.), methacrylic acid (36.0 g.) are polymerized in 75/25//toluene/2-ethoxyethyl acetate as described in Example 1 using benzoyl peroxide initiator. The final copolymer has a viscosity of 275 cps. at 25° C. and 40.4% solids.

EXAMPLE 4 - MMA/BA/MAA//68.1/26.9/5.0 wt. %

A monomer mix of methyl methacrylate (742.6 g.) butyl acrylate (293.3 g.), methacrylic acid (54.5 g.), benzoyl peroxide (32.7 g.), n-dodecyl mercaptan (11.0 g.) and toluene (363.4 g.) is added to refluxing toluene (897.8 g.) under nitrogen over a period of 2.5 hours. After a thirty minute hold period at reflux, the polymerization is completed by the addition of benzoyl peroxide (8.7 g.) in toluene (363.4 g.) over 1 hour followed by a 30 minute hold at reflux. The resulting copolymer solution is clear and water white at 38.5% solids with a viscosity of 320 cps. at 25° C. (Polymerization in the absence of chain regulator gives a polymer of 500 cps. viscosity).

EXAMPLE 5 - MMA/BA/MAA//75/20/5 wt. %

By following substantially the procedure of Example 4 and by employing methyl methacrylate (816.9 g.) butyl acrylate (218.1 g.), methacrylic acid (54.5 g.), n-dodecylmercaptan (11.0 g.) and toluene (363.4 g.), there is obtained a copolymer solution of 40.0% solids and 400 cps. at 25° C. In the absence of chain regulator, a polymer of viscosity 550 cps. is obtained.

EXAMPLE 6 - MMA/BA/MAA//40/50/10 wt. %

Methyl methacrylate (400 g.), butyl acrylate (500 g.) and methacrylic acid (100 g.) are added simultaneously with dicumyl peroxide (3.0 g.) in 2-butoxyethanol (80 g.) over a 4 hour period to 2-butoxyethanol (172.5 g.) at 150° C. under an atmosphere of nitrogen with continuous stirring. The reaction temperature is maintained at 150° C. for one hour and then cooled to 100° C. Concentrated aqueous ammonia (66 g.) and deionized water (1126.5 g.) are added over a 20 minute period and the resulting clear solution cooled to 25° C. The pH of the solution is adjusted to 9 by the addition of concentrated aqueous ammonia (12 g.). The final product is a 39.3 % wt. solution of the ammonium salt of copoly MMA/BA/MAA//40/50/10 wt. % in water/2-butoxyethanol//83.7/16.3 wt. % and has a viscosity at 25° C. of 9600 cps.

EXAMPLE 7 - EA/St/MAA//60/30/10 - 50 wt. % Solids in Solvesso 150/2-ethoxyethyl acetate//75/25 wt. % Solvent Ethyl acrylate (600 g.), styrene (300 g.), methacrylic acid (100 g.) and benzoyl peroxide (10 g.) are added to Solvesso 150/2-ethoxyethyl acetate 75/25 (900 g.) and maintained at 100° C. over a period of 3 hours. After a 0.5 hour hold at reflux, benzoyl peroxide (2.4 g.), in the same solvent (100 g.), is added over a period of one hour. A further hold of 0.5 hours at 110° C. is required for completion of the polymerization. The final copolymer solution had a viscosity of 700 cps. at 50 wt. % solids at 25° C.

EXAMPLE 8 - EA/MAA//95.9/4.1 wt. %

To a 3 liter 3 necked flask equipped with a stirrer and nitrogen inlet tube, a thermometer and a reflux condenser is added the following: 8 parts of sodium dodecyl benzene sulfonate, 767.2 parts ethyl acrylate, 32.8 parts of methacrylic acid and 1560 parts of water. A slow stream of nitrogen is bubbled through the stirred emulsion. There is then added 8 parts of 34.9% hydrogen peroxide and 3.2 parts of sodium formaldehyde sulfoxylate dihydrate dissolved in 25 parts of water. The temperature of the reaction mixture rises from 23° to 76° C. As the reaction diminishes and the temperature decreases to 64° C., the reaction mixture is cooled with an ice bath. The pH at the end of the reaction is 2.9 and the solids content is 33.5 wt. %.

EXAMPLE 9 -
N-Methyl-N-(β-hydroxyethyl)methacrylamide

Methyl methacrylate (20 g., 0.2 m.), 2-methylaminoethanol (15 g., 0.2 m.), toluene (35.7 g.) and MEHQ (0.1 g.) are mixed under a nitrogen atmosphere in a flask equipped with a condenser, stirrer and thermometer. Sodium methoxide/methanol (4.0 g.) is added rapidly and the reaction temperature maintained at 20° C. by external cooling. The reaction is complete in 30 minutes as indicated by the residual base titration reaching a minimum. The crude product is treated with an excess of strong acid ion exchange resin (Amberlyst ® 15) to remove basic materials. The ion exchange resin is removed by filtration and the toluene removed under vacuum to afford 20 g. of N-methyl-N-(β-hydroxyethyl)methylacrylamide, b.p. 120°–122° c./0.5 mm. (MEHQ is methyl ethyl hydroquinone.)

Elemental Analysis for $C_7H_{13}NO_2$: Calcd. C, 58.8; H, 9.1; N, 9.7; O, 22.4. Found: C, 59.2; H, 9.1; N, 8.9; O, 22.8.

EXAMPLE 10 -
Bis[N,N-(β-hydroxyethyl)]methacrylamide

To a flask equipped with a stirrer, nitrogen bleed, thermometer and condenser is added methyl methacrylate (100 g., 1 m.), diethanolamine (105 g., 1 m.), tert-butanol (175 g.) and MEHQ (0.2 g.). Sodium methoxide/methanol (18.5 g., 25 weight %) is then added rapidly and the temperature maintained below 25° C. by external cooling. After 90 minutes, 76% of the base charge is consumed. The product is isolated as described above in Example 9. Infrared analysis and nuclear magnetic resonance data are consistent with the assigned structure.

EXAMPLE 11 - Preparation of Polymer Containing N-methyl-N-(β-hydroxyethyl)methacrylamide (MHEMAM)

A. Preparation of
MMA/BA/MHEMAM//73.4/19.6/7.0 wt. %

| Charge | Grams |
|---|---|
| Initiator and Monomer Mix | |
| MMA | 734 |
| BA | 196 |
| MHEMAM | 70 |
| Toluene | 168.8 |
| n-propyl acetate | 168.8 |
| 2,2'-axobisisobutyronitrile (AIBN) | 7.5 |
| Heel Charge | |
| Toluene | 375 |
| n-propyl acetate | 375 |
| 1st Chaser | |
| Toluene | 168.8 |
| n-propyl acetate | 168.8 |
| AIBN | 0.75 |
| 2nd Chaser | |
| Toluene | 37.5 |
| n-propyl acetate | 37.5 |
| AIBN | |

Procedure: The Heel Charge is added to a kettle fitted with stirrer, condenser, nitrogen inlet and addition funnel. The mixture is heated to reflux (100° C.). At reflux, the initiator and monomer mix is added over 2.5 hours, while maintaining reflux and a nitrogen blanket. The 1st chaser catalyst is then added over one hour and held for ½ hour. The 2nd chaser catalyst is then added over ½ hour and held for one hour. The mixture is then cooled and the reaction terminated.

EXAMPLE 12

Example 11 is repeated with bis[N,N-(β-hydroxyethyl)] methacrylamide being substituted for the MHEMAM.

EXAMPLE 13

The polymer solutions of each of Examples 1–5 and 7 are mixed, on an equivalent basis, with the polymer solution of each of Examples 11 and 12. The solutions are applied as an 8 mil film to Alodyne aluminum; dried at room temperature for for one hour, then heated at 300° C. for one hour, to give coated articles resistant to solvents and water.

EXAMPLE 14

The polymers of Examples 6 and 8 are each emulsified with the polymer solutions of each of Examples 11 and 12 in equivalent amounts, and applied and cured as in Example 13.

We claim:

1. A method of curing addition polymers having carboxy groups, carboxylic anhydrides or salts of said carboxy groups which comprises the steps of (1) mixing said polymer with a different addition polymer containing two or more pendant β-hydroxyalkyl amide groups of the formula:

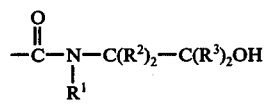

IV wherein $R^1$ is hydrogen, alkyl having 1 to 5 carbon atoms, or hydroxyalkyl having from 1 to 5 carbon atoms; $R^2$ and $R^3$ are the same or different radicals selected from hydrogen, straight or branched chain alkyl having from 1 to 5 carbon atoms, or one of the $R^2$ and one of the $R^3$ radicals joined together with the carbon atoms to which they are attached form cycloalkyl and (2) heating the mixture at a temperature of from about 125° to 400° C. until a cured polymer is obtained.

2. A method according to claim 1 wherein the β-hydroxyalkyl amide groups are present in a minor proportion in an addition copolymer containing the residues of polymerized ethylenically unsaturated monomers, and said hydroxyalkylamide groups have the formula:

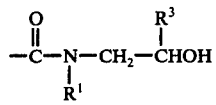    IVa wherein $R^1$ is hydrogen, alkyl having 1 to 5 carbon atoms, or hydroxyalkyl having 1 to 5 carbon atoms, and $R^3$ is selected from hydrogen and straight or branched chain lower alkyl radicals having from 1 to 5 carbon atoms.

3. The method of claim 2 in which $R^1$ is

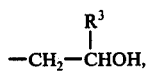

and $R^3$ is —H or —$CH_3$.

4. The method of claim 3 in which the carboxy, carboxylic acid salt groups, or carboxylic acid anhydride groups are in an addition copolymer of ethylenically unsaturated monomers, and the copolymer is prepared with a minor proportion of at least one monomer selected from acrylic acid, methacrylic acid, crotonic acid, maleic acid, 2-methyl maleic acid, itaconic acid, 2-methyl itaconic acid, β-methylene glutaric acid, maleic anhydride, itaconic anhydride, acrylic anhydride, and methacrylic anhydride.

5. The method of claim 4 in which the ratio of salt, carboxy or anhydride functional groups to hydroxy functional groups is between about 0.5 and about 2 parts of hydroxy function per 1 part of carboxy function, wherein one anhydride group is equal to two carboxy functions, and the curing temperature is in the range of 125° to 175° C.

6. The method of claim 1 which comprises treating said carboxy or anhydride containing polymer with the β-hydroxyalkyl amide-containing polymer in proportions such that the ratio of hydroxy to carboxyl functions is between 0.5:1 and 2:1, wherein one anhydride function is considered equal to two carboxy functions, and the curing temperature is in the range of about 125° to 175° C.

7. The method of claim 6 wherein a liquid selected from aromatic or aliphatic compounds, water, dimethyl formamide, dimethyl sulfoxide, ethers, esters and alcohols is employed as the medium for carrying the mixture.

8. The method of claim 5 in which (a) the carboxy, carboxylic salt, or anhydride groups are present as the residues of addition copolymerized monomers in the amount of 1% to 20% by weight of the total monomers and (b) the hydroxyalkyl amide groups are present in the different polymer as the residues of an addition copolymerized monomer in the amount of 1% to 20% of the total monomers.

9. The method of claim 6 in which (a) the carboxy, carboxylic salt, or anhydride groups are present as the residues of addition copolymerized monomers in the amount of 1% to 20% by weight of the total monomers and (b) the hydroxyalkyl amide groups are present in the different polymer as the residues of an addition copolymerized monomer in the amount of 1% to 20% of the total monomers.

10. A method of curing addition polymers having carboxy groups, carboxylic anhydride groups, or salts thereof, with a different addition polymer containing two or more pendant β-hydroxyalkyl amide groups of the formula:

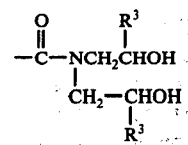

wherein $R^3$ is H or —$CH_3$, the carboxy, carboxylic anhydride groups, or salts thereof are in a copolymer prepared with a minor proportion of at least one ethylenically unsaturated acid monomer selected from acrylic acid, methacrylic acid, crotonic acid, maleic acid, 2-methyl maleic acid, itaconic acid, 2-methyl itaconic acid, β-methylene glutaric acid, maleic anhydride, itaconic anhydride, acrylic anhydride, and methacrylic anhydride, in which the ratio of a salt, carboxy, or anhydride functional groups to hydroxy functional groups is between about 0.5 and about 2 parts of hydroxy function per 1 part of carboxy function, wherein one anhydride group is equal to two carboxy functions, and the curing temperature is in the range of 125° to 175° C., and wherein a liquid selected from aromatic or aliphatic compounds, water, dimethyl formamide, dimethyl sulfoxide, ethers, esters, and alcohols is employed as the medium for carrying the mixture.

11. The method of claim 10 in which said ethylenically unsaturated acid monomer is acrylic acid or methacrylic acid.

12. The method of claim 10 wherein the liquid is water.

13. A curable composition containing a mixture of (a) an addition copolymer of ethylenically unsaturated monomers containing carboxy groups, salts of carboxy groups or carboxylic anhydride groups with (b) a different addition polymer containing pendant hydroxyalkyl amide groups of the formula:

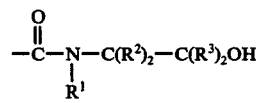    IV wherein $R^1$ is hydrogen or alkyl having 1 to 5 carbon atoms, or a hydroxyalkyl having from 1 to 5 carbon atoms; $R^2$ and $R^3$ are the same or different radicals selected from hydrogen, straight or branched chain alkyl having from 1 to 5 carbon atoms, or one of the $R^2$ and one of the $R^3$ radicals joined together with the carbon atoms to which they are attached to form cycloalkyl.

14. A composition according to claim 13 wherein the pendant β-hydroxyalkyl amide groups have the formula:

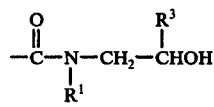    IVa wherein $R^1$ is hydrogen, alkyl having 1 to 5 carbon atoms, or hydroxyalkyl having 1 to 5 carbon atoms and $R^3$ is selected from hydrogen, and straight or branched chain lower alkyl radicals having from 1 to 5 carbon atoms.

15. The composition of claim 14 in which $R^1$ is

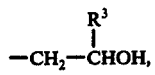

and $R^3$ is —H or —CH$_3$.

16. The composition of claim 13 in which the carboxy, carboxylic and salt groups, or carboxylic acid anhydride groups are in an addition copolymer of ethylenically unsaturated monomers, and the copolymer is prepared from a minor proportion of at least one monomer selected from acrylic acid, methacrylic acid, crotonic acid, maleic acid, 2-methylmaleic acid, itaconic acid, 2-methylitaconic acid, β-methyleneglutaric acid, maleic anhydride, itaconic anhydride, acrylic anhydride, and methacrylic anhydride.

17. The composition of claim 16 in which the pendant β-hydroxyalkyl amide groups and carboxylic acid functions are present in a ratio of hydroxy to carboxy of between 0.5:1 and 2:1, the anhydride group being considered to be equal to two carboxy functions.

18. The composition of claim 17 containing a liquid selected from aromatic or aliphatic liquids, water, dimethyl formamide, dimethyl sulfoxide, ethers, esters, and alcohols.

19. The composition of claim 16 wherein the liquid is water.

20. A cured polymeric material prepared by the process of claim 1.

21. A cured polymeric material prepared by the method of claim 2.

22. An article of manufacture in the form of a substrate having a coating of the cured polymeric material of claim 21.

23. The cured polymeric material of claim 21 in the form of a film.

24. The composition of claim 13 in which said groups in each of copolymers (a) and (b) are present as the residues of monomers in the amounts of 1% to 20% of the total monomers in the respective copolymers.

25. The composition of claim 14 in which said groups in each of copolymers (a) and (b) are present as the residues of monomers in the amounts of 1% to 20% of the total monomers in the respective copolymers.

* * * * *